US009684138B2

(12) United States Patent
Lu

(10) Patent No.: US 9,684,138 B2
(45) Date of Patent: Jun. 20, 2017

(54) RUGGEDIZED FIBER OPTIC CONNECTOR

(71) Applicant: ADC TELECOMMUNICATIONS, INC., Berwyn, PA (US)

(72) Inventor: Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/402,728

(22) PCT Filed: May 20, 2013

(86) PCT No.: PCT/US2013/041768
§ 371 (c)(1),
(2) Date: Nov. 21, 2014

(87) PCT Pub. No.: WO2013/177016
PCT Pub. Date: Nov. 28, 2013

(65) Prior Publication Data
US 2016/0187590 A1    Jun. 30, 2016

Related U.S. Application Data

(60) Provisional application No. 61/650,216, filed on May 22, 2012.

(51) Int. Cl.
*G02B 6/36* (2006.01)
*G02B 6/38* (2006.01)

(52) U.S. Cl.
CPC ........... *G02B 6/387* (2013.01); *G02B 6/3821* (2013.01); *G02B 6/3847* (2013.01);
(Continued)

(58) Field of Classification Search
CPC .... G02B 6/387; G02B 6/3821; G02B 6/3849; G02B 6/3871; G02B 6/3887; G02B 6/3894
(Continued)

(56) References Cited

U.S. PATENT DOCUMENTS 5,261,019 A * 11/1993 Beard ................. G02B 6/3821
385/60
5,330,366 A    7/1994 Tsuji et al.
(Continued)

FOREIGN PATENT DOCUMENTS

CN    102385120 A    3/2012
EP    0 514 174 A1    11/1992
(Continued)

OTHER PUBLICATIONS

International Search Report for International Application No. PCT/US2013/041768 mailed 26 Aug. 2013 (11 pages).
(Continued)

*Primary Examiner* — Ellen Kim
(74) *Attorney, Agent, or Firm* — Merchant & Gould P.C.

(57) ABSTRACT

The present disclosure relates to a fiber optic connector that includes a main outer housing, an inner housing that mounts within the main outer housing and a plug interface housing secured at the distal end of the inner housing. The fiber optic connector also includes a ferrule assembly mounted at least partially within the plug interface housing, a spring for biasing the ferrule assembly in a distal direction and a resilient cable seal that mounts within the main outer housing.

11 Claims, 20 Drawing Sheets

(52) U.S. Cl.
CPC ......... *G02B 6/3849* (2013.01); *G02B 6/3871* (2013.01); *G02B 6/3887* (2013.01); *G02B 6/3894* (2013.01); *G02B 6/3889* (2013.01)

(58) Field of Classification Search
USPC .............................................. 385/78, 81, 87
See application file for complete search history.

(56) References Cited

U.S. PATENT DOCUMENTS

| | | | | |
|---|---|---|---|---|
| 5,671,310 | A * | 9/1997 | Lin | G02B 6/3869 385/78 |
| 5,809,192 | A * | 9/1998 | Manning | G02B 6/3843 385/76 |
| 6,019,521 | A | 2/2000 | Manning et al. | |
| 6,203,210 | B1 * | 3/2001 | Mikula | G02B 6/3869 385/60 |
| 6,206,714 | B1 | 3/2001 | Bernardini | |
| 6,325,656 | B1 | 12/2001 | Fukuda et al. | |
| 6,579,014 | B2 | 6/2003 | Melton et al. | |
| 6,629,782 | B2 * | 10/2003 | McPhee | G02B 6/3843 385/76 |
| 6,648,520 | B2 | 11/2003 | McDonald et al. | |
| 6,884,113 | B1 | 4/2005 | Montena | |
| 6,899,467 | B2 | 5/2005 | McDonald et al. | |
| 7,481,585 | B2 * | 1/2009 | Scadden | G02B 6/3817 385/75 |
| 7,572,065 | B2 * | 8/2009 | Lu | G02B 6/3816 385/55 |
| 7,762,726 | B2 * | 7/2010 | Lu | G02B 6/3816 385/53 |
| 7,881,576 | B2 | 2/2011 | Melton et al. | |
| 7,918,608 | B2 | 4/2011 | Braun | |
| 7,942,590 | B2 | 5/2011 | Lu et al. | |
| 7,959,361 | B2 | 6/2011 | Lu et al. | |
| 8,342,755 | B2 * | 1/2013 | Nhep | G02B 6/3887 385/78 |
| 8,573,859 | B2 | 11/2013 | Larson et al. | |
| 8,840,320 | B2 | 9/2014 | Park et al. | |
| 8,876,405 | B2 * | 11/2014 | Larson | G02B 6/3887 385/78 |
| 8,899,845 | B2 * | 12/2014 | Gallegos | G02B 6/3826 385/76 |
| 2005/0041928 | A1 | 2/2005 | Zimmel et al. | |
| 2005/0141817 | A1 | 6/2005 | Yazaki et al. | |
| 2007/0077010 | A1 * | 4/2007 | Melton | G02B 6/4471 385/55 |
| 2008/0273840 | A1 | 11/2008 | Lu et al. | |
| 2009/0162016 | A1 | 6/2009 | Lu et al. | |
| 2009/0304335 | A1 | 12/2009 | Marcouiller et al. | |
| 2010/0183264 | A1 | 7/2010 | Lu | |
| 2010/0284655 | A1 | 11/2010 | Nakano et al. | |
| 2010/0296778 | A1 | 11/2010 | Katagiyama et al. | |
| 2011/0116749 | A1 | 5/2011 | Kuffel et al. | |
| 2011/0280521 | A1 | 11/2011 | Kachmar | |

FOREIGN PATENT DOCUMENTS

| | | |
|---|---|---|
| EP | 0 694 994 A1 | 1/1996 |
| EP | 1 791 223 A2 | 5/2007 |
| WO | WO 01/59501 | 8/2001 |
| WO | WO 2006/108609 A1 | 10/2006 |

OTHER PUBLICATIONS

European Search Report for Application No. 13794662.0 mailed May 31, 2016.
Engineering drawing from TE Connectivity, Drawing No. C-828904, dated Mar. 21, 2011.
Mini-Universal MATE-N-LOK Connector System, Quick Reference Guide, TE Connectivity, ©2011.

\* cited by examiner

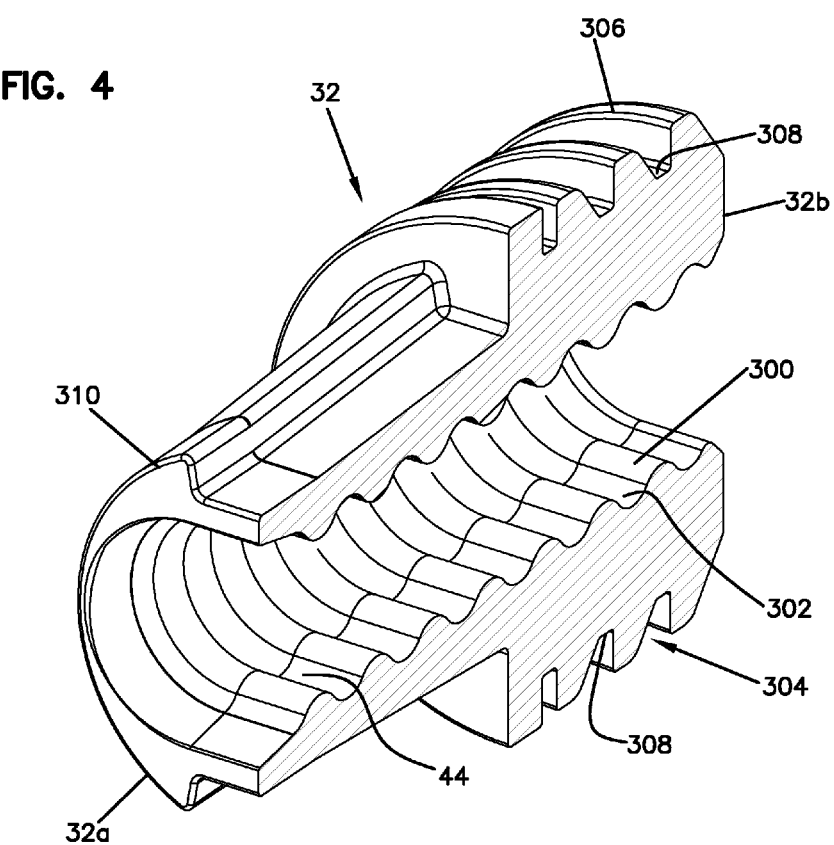

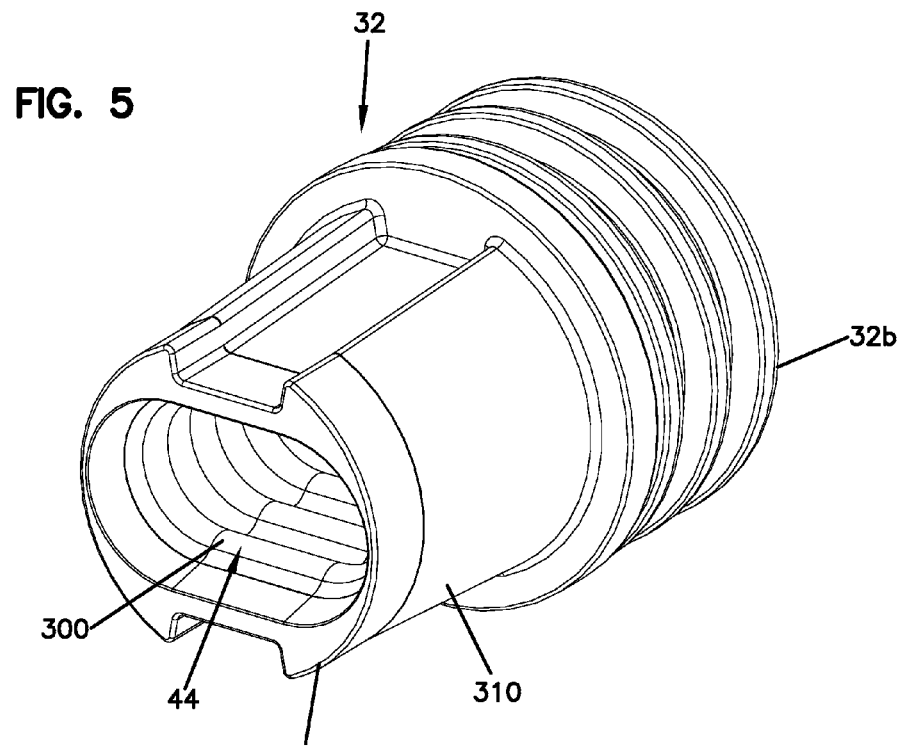
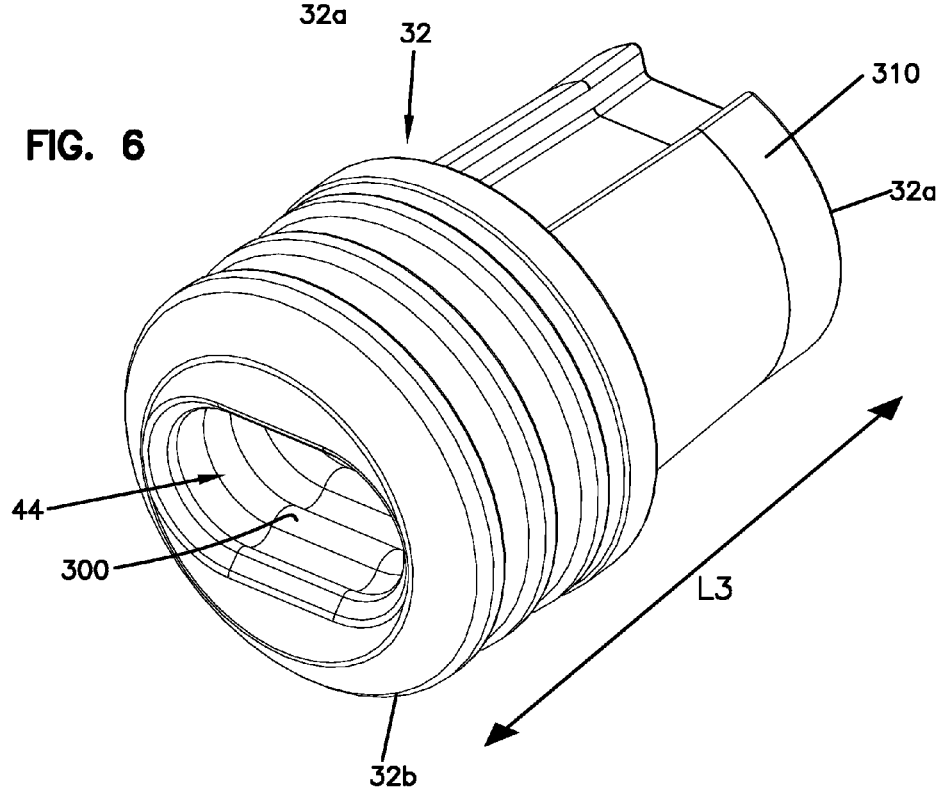

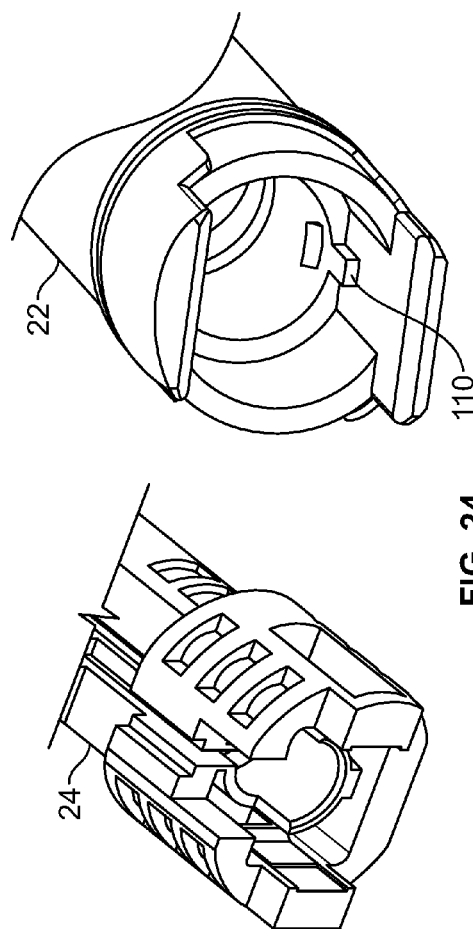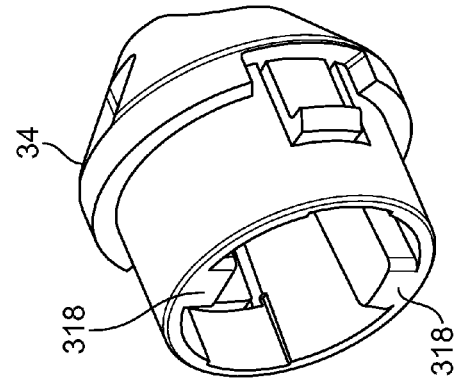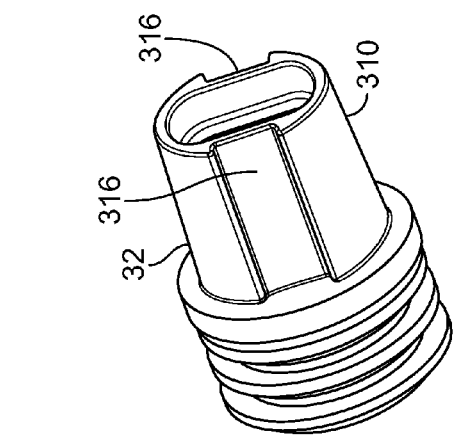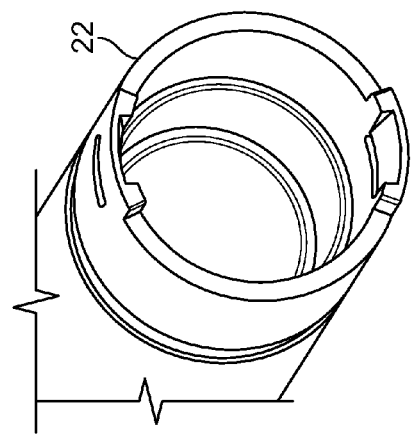
FIG. 24
FIG. 25

RUGGEDIZED FIBER OPTIC CONNECTOR

This application is a National Stage of PCT International Patent application No. PCT/US2013/041768 filed on 20 May 2013 and claims priority to U.S. Patent Application Ser. No. 61/650,216 filed on 22 May 2012, and which applications are incorporated herein by reference. To the extent appropriate, a claim of priority is made to each of the above disclosed applications.

TECHNICAL FIELD

The present disclosure relates in general to fiber optic connectors. More particularly, the present disclosure relates to ruggedized fiber optic connectors suitable for use in outside environments.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel, and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that support the ends of the optical fibers of the fiber optic cables. The end faces of the ferrules are typically polished and are often angled. The fiber optic adapter includes co-axially aligned ports (i.e., receptacles) for receiving the fiber optic connectors desired to be interconnected. The fiber optic adapter includes an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described at U.S. Pat. Nos. 6,579,014, 6,648,520, and 6,899,467.

Fiber optic connector systems for use in outside environments have been developed. Such systems typically include more rugged designs capable of handling larger pulling forces than typical indoor connectors. Further, such systems are preferably environmentally sealed to limit the intrusion of moisture or other contaminants into the systems. Example ruggedized (i.e., hardened) connector systems of this type are disclosed at U.S. Pat. Nos. 7,942,590; 7,762,726; 7,959,361; 6,899,467; 7,918,609 and 7,881,576.

SUMMARY

One aspect of the present disclosure relates to a ruggedized fiber optic connector including various components that interconnect through snap-fit connections. The snap-fit connections facilitate assembly of the fiber optic connector.

Another aspect of the present disclosure relates to a ruggedized fiber optic connector having a resilient cable seal that is compressed at a proximal end of the connector to provide a sealing interface with a housing of the connector as well as the jacket of a cable routed into the connector. In certain embodiments, the resilient cable seal has inner and outer sealing ribs. In still other embodiments, the resilient cable seal is compressed by an end cap of the fiber optic connector.

A further aspect of the present disclosure relates to a ruggedized fiber optic connector that can readily be used with splice-on ferrules. In one example embodiment, the ruggedized fiber optic connector can include a side slot for allowing an optical fiber to be routed laterally out of the connector to facilitate splicing a ferrule to the end of the optical fiber.

A variety of other aspects are set forth in the description that follows. The aspects relate to individual features as well as to combinations of features. It is to be understood that both the foregoing general description and the following detailed description are exemplary and explanatory only and are not restrictive of the broad inventive aspects disclosed herein.

BRIEF DESCRIPTION OF THE DRAWINGS

FIG. 4 is a perspective, cross-sectional view of a resilient cable seal of the ruggedized fiber optic connector of FIG. 1;

FIG. 5 is a perspective view showing a proximal end of the resilient cable seal of FIG. 4;

FIG. 6 is an perspective view showing a distal end of the resilient cable seal of FIG. 4;

FIG. 24 shows a keyed interface provided between the inner and outer housings of the ruggedized fiber optic connector of FIG. 1;

FIG. 25 shows a keyed interface provided between the outer housing, the resilient cable seal and the proximal end cap of the ruggedized fiber optic connector of FIG. 1;

DETAILED DESCRIPTION

Figure 1:
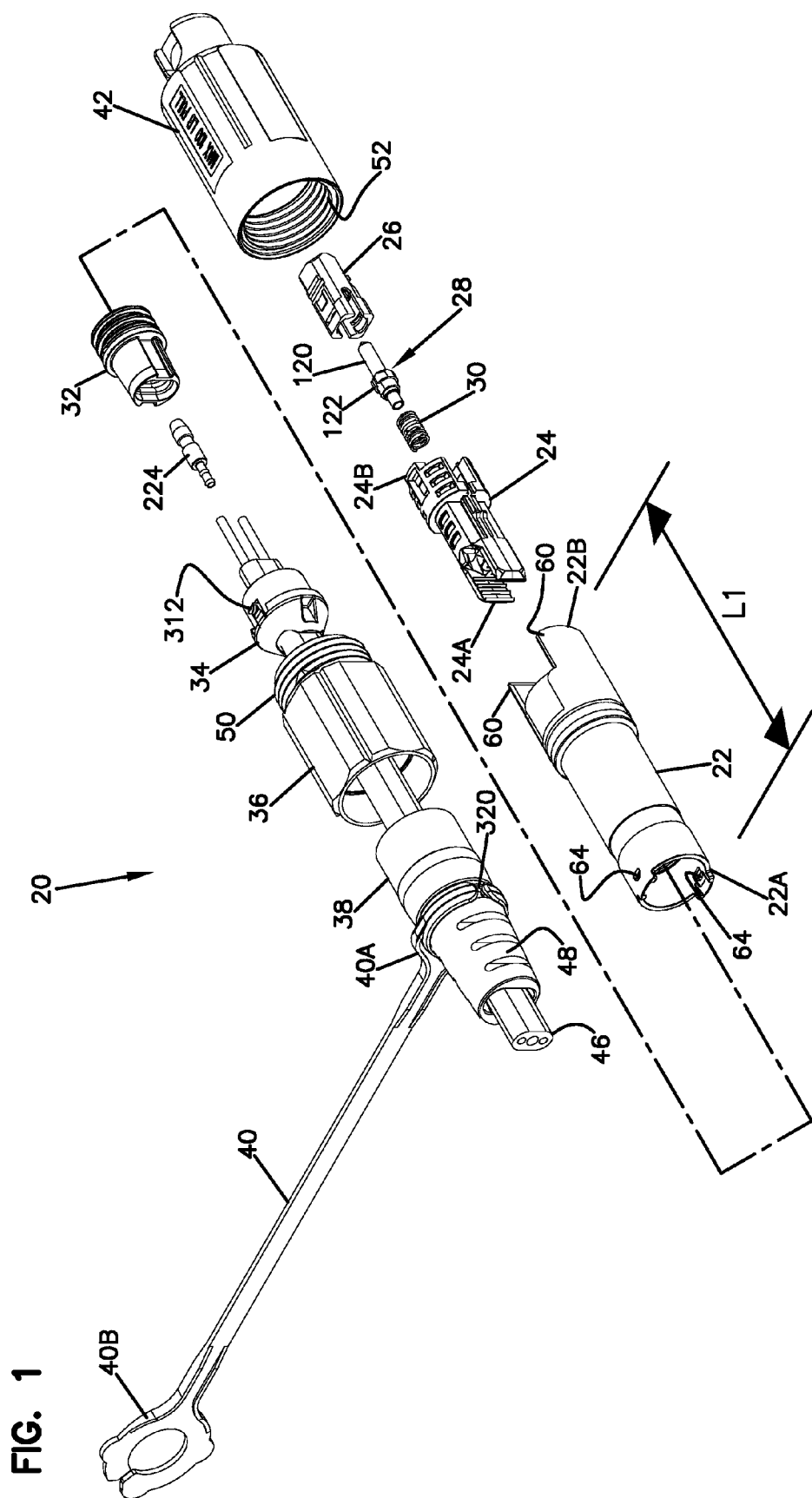
FIG. 1 is an exploded, perspective view of a ruggedized fiber optic connector in accordance with the principles of the present disclosure.

FIG. 1 illustrates a ruggedized fiber optic connector 20 in accordance with the principles of the present disclosure. The ruggedized fiber optic connector 20 includes a main outer housing 22 having a proximal end 22A and a distal end 22B. The ruggedized fiber optic connector 20 also includes an inner housing 24 that mounts within the main outer housing 22 and is loaded into the main outer housing 22 through the distal end 22B of the main outer housing 22. The inner housing 24 includes a proximal end 24A and a distal end 24B. The ruggedized fiber optic connector 20 further includes a plug interface housing 26, a ferrule assembly 28 and a spring 30. The spring 30 is adapted to bias the ferrule assembly 28 in a distal direction. The ferrule assembly 28 mounts at least partially within the plug interface housing 26 and the spring 30 is compressed between the inner housing 24 and the ferrule assembly 28.

Referring still to FIG. 1, the ruggedized fiber optic connector 20 further includes a resilient cable seal 32, an end cap 34, a coupling nut 36, a boot 38, a lanyard 40 and a dust cap 42. The resilient cable seal 32 mounts within the main outer housing 22 and is adapted to form an outer perimeter seal against the main outer housing 22. The resilient cable seal 32 defines an inner passage 44 (see FIG. 4) for receiving a cable 46 and for providing a perimeter seal about the cable 46. The end cap 34 mounts at the proximal end 22A of the main outer housing 22 and is adapted for compressing at least a portion of the resilient cable seal 32. The boot 38 mounts over the coupling nut 36 and the proximal end 22A of the main outer housing 22. The boot 38 has a tapered portion 48 that provides bend radius protection and strain relief to the cable 46. The lanyard 40 has a first end 40A that couples to the boot 38 and a second end 40B adapted to couple to the dust cap 42. The first end 40A of the lanyard 40 has a c-shaped coupling member that fits within a circular groove 320 that extends fully around the boot 38. Thus, the first end 40a can be rotated within the groove 320 about the boot 38. The coupling nut 36 mounts over the main outer housing 22. The coupling nut 36 has exterior threads 50 that mate with corresponding interior threads 52 of the dust cap 42 to secure the dust cap 42 over the distal end 22B of the main outer housing 22.

When it is desired to insert the fiber optic connector 20 into a corresponding ruggedized fiber optic adapter, the dust cap 42 is removed by unthreading the coupling nut 36 from the dust cap 42. After the dust cap 42 has been removed, the distal end of the fiber optic connector 20 can be inserted into the fiber optic adapter and retained in place by threading the coupling nut 36 into corresponding threads provided within the fiber optic adapter. An example fiber optic adapter is disclosed in U.S. Pat. No. 6,579,014 that is hereby incorporated by reference in its entirety.

Figure 2:
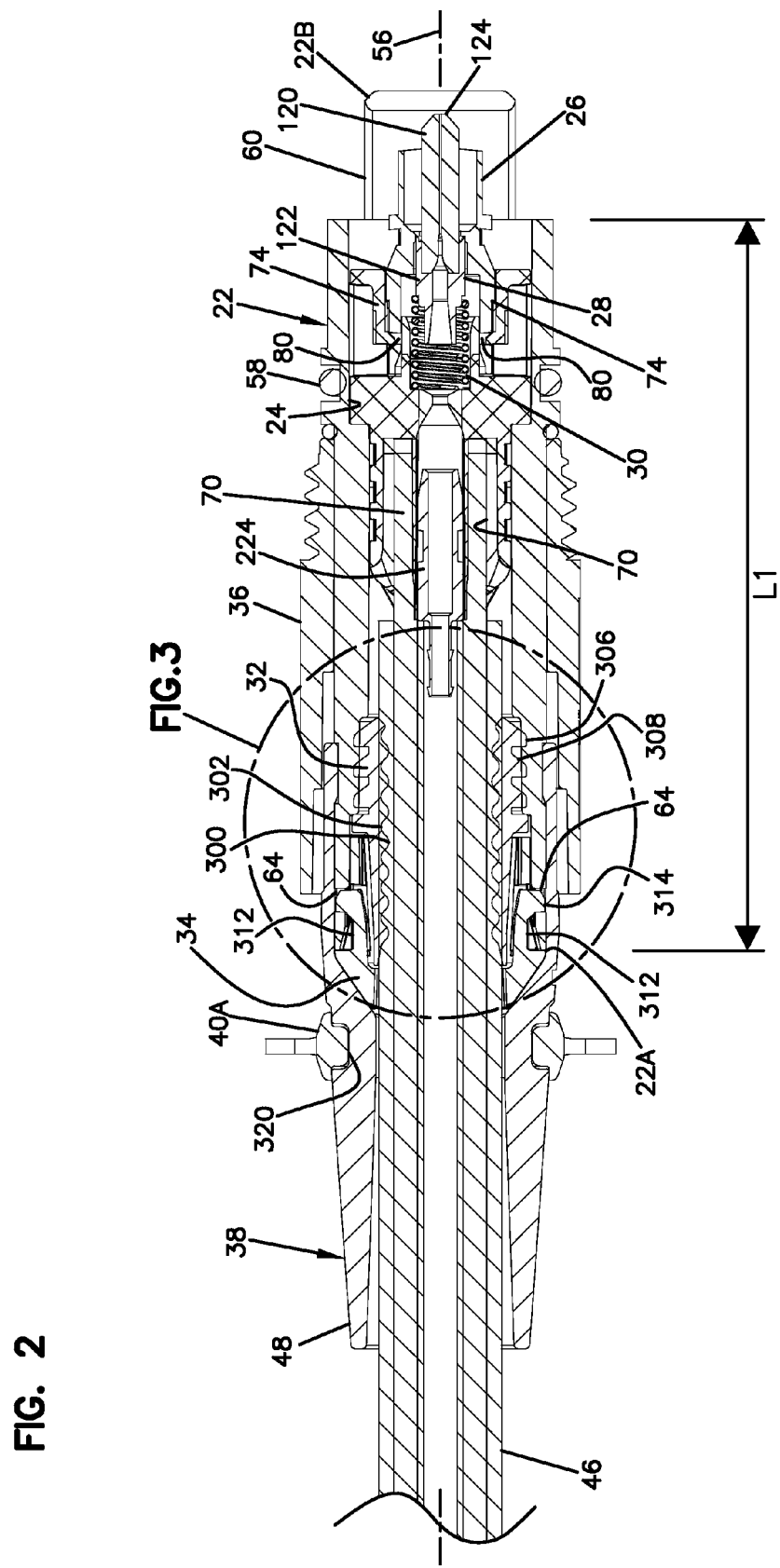
FIG. 2 is a cross-sectional view of the ruggedized fiber optic connector of FIG. 1.
Figure 11:
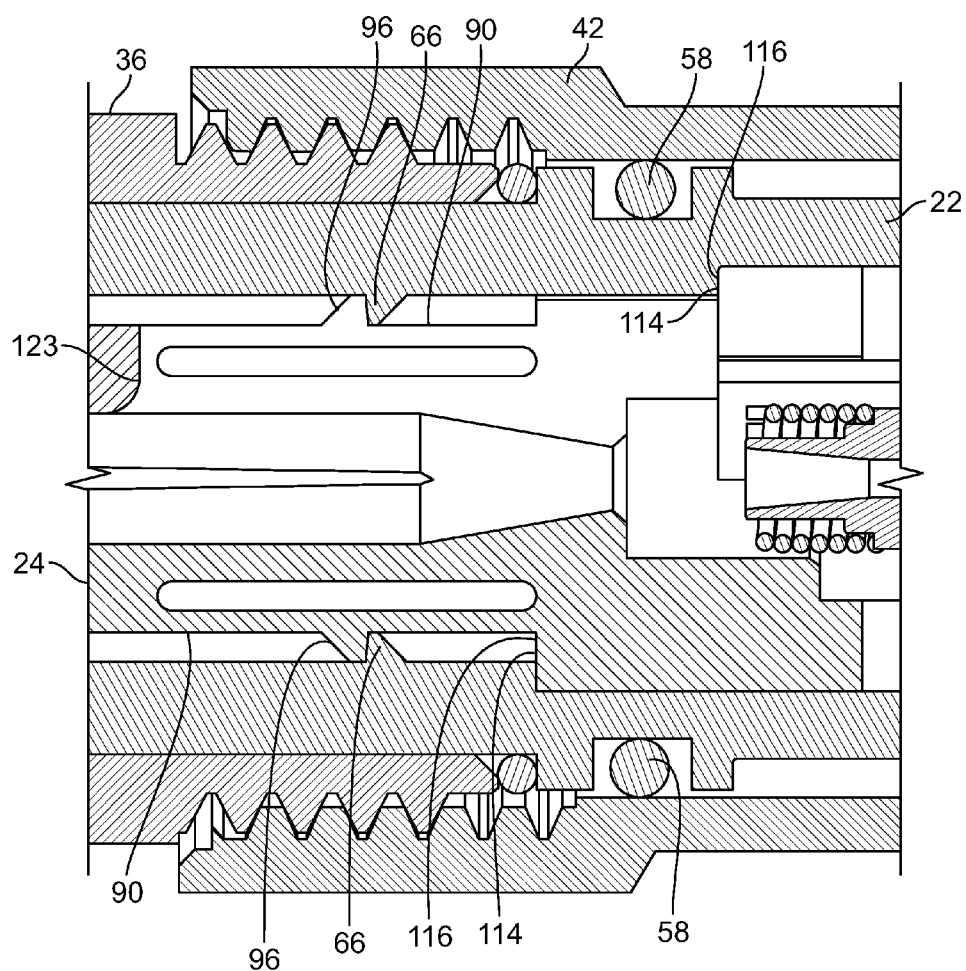
FIG. 11 is a cross-sectional view of the ruggedized fiber optic connector of FIG. 1 showing a snap-fit connection between the inner housing and outer housing of the ruggedized fiber optic connector.
Figure 12:
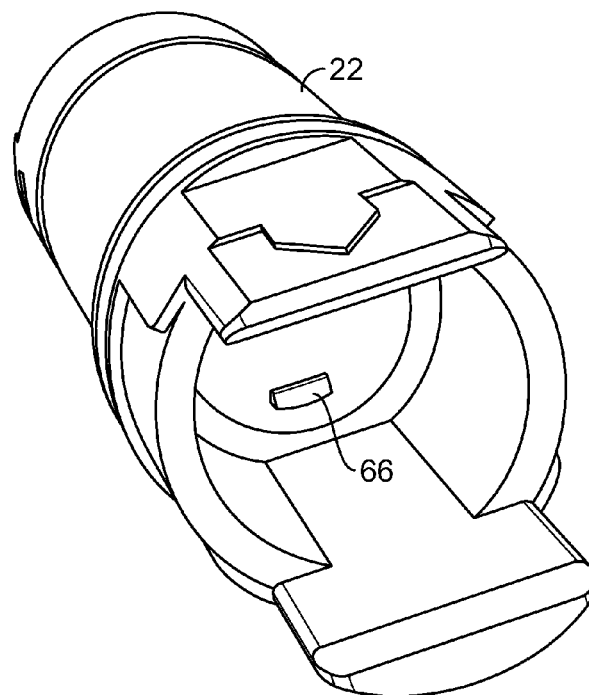
FIG. 12 is a perspective view of a distal end of the outer housing of the ruggedized fiber optic connector of FIG. 1.
Figure 13:
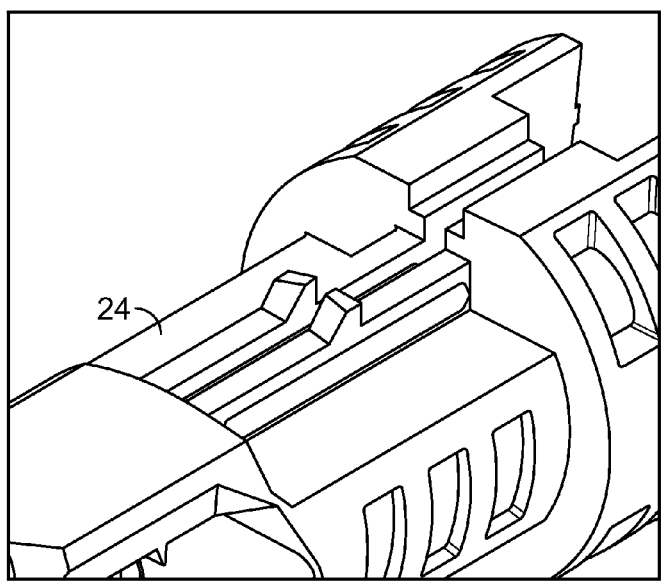
FIG. 13 is a perspective view of a flexible beam and tab arrangement that forms a snap-fit connection structure of the inner housing of the ruggedized fiber optic connector of FIG. 1.
Figure 16:
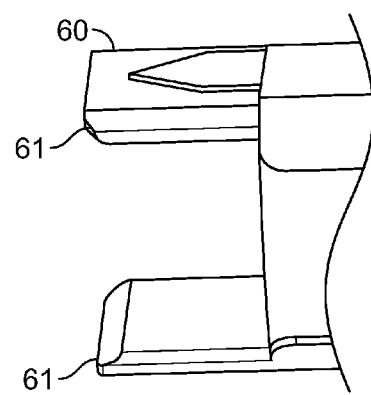
FIG. 16 is a perspective view of a distal end of the main outer housing of the ruggedized fiber optic connector of FIG. 1.
Figure 17:
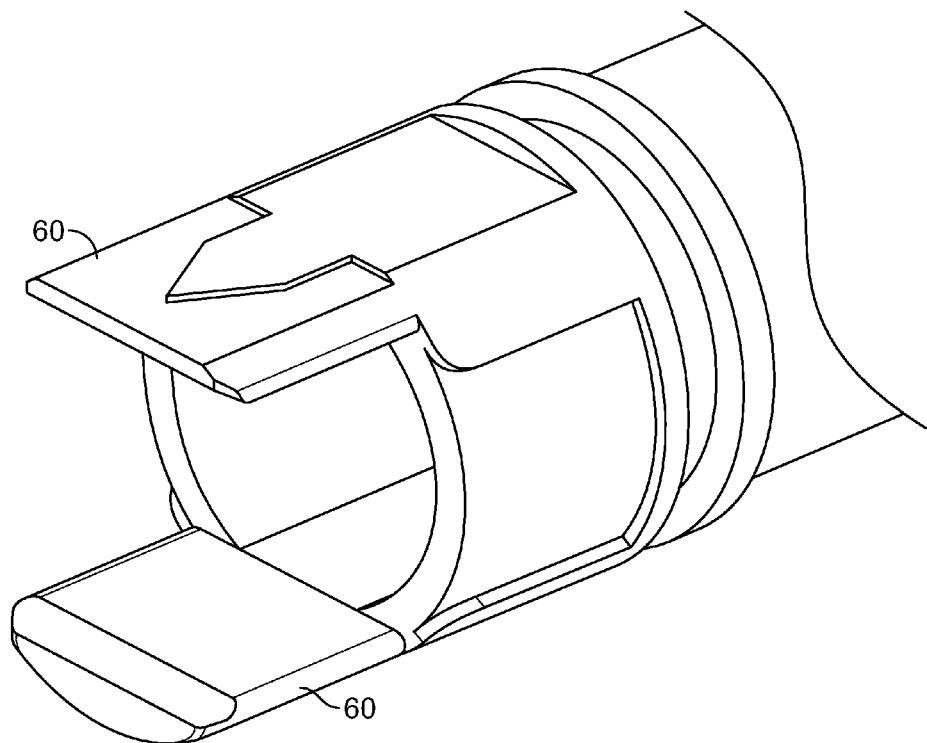
FIG. 17 is another perspective view of the distal end of the main outer housing of the ruggedized fiber optic connector of FIG. 1.
Figure 18:
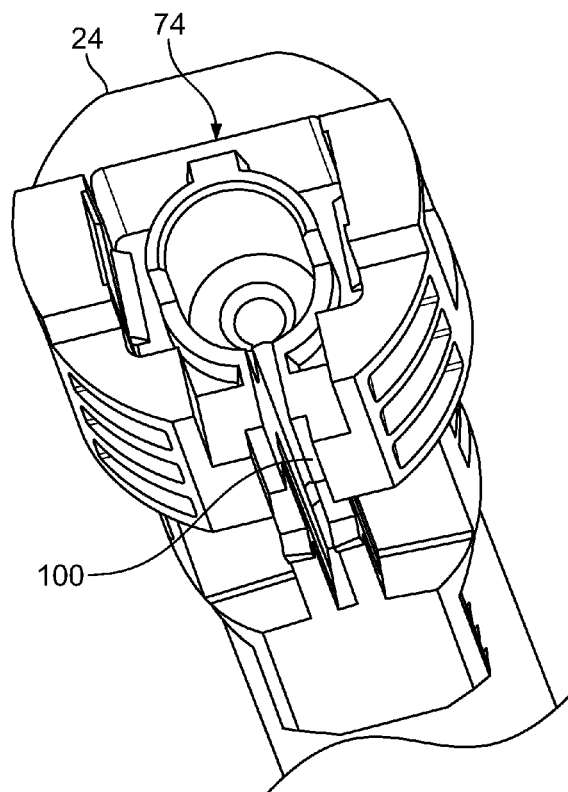
FIG. 18 is a perspective view of the inner housing of the ruggedized fiber optic connector of FIG. 1 showing a lateral fiber routing slot defined through the distal end of the inner housing.
Figure 19:
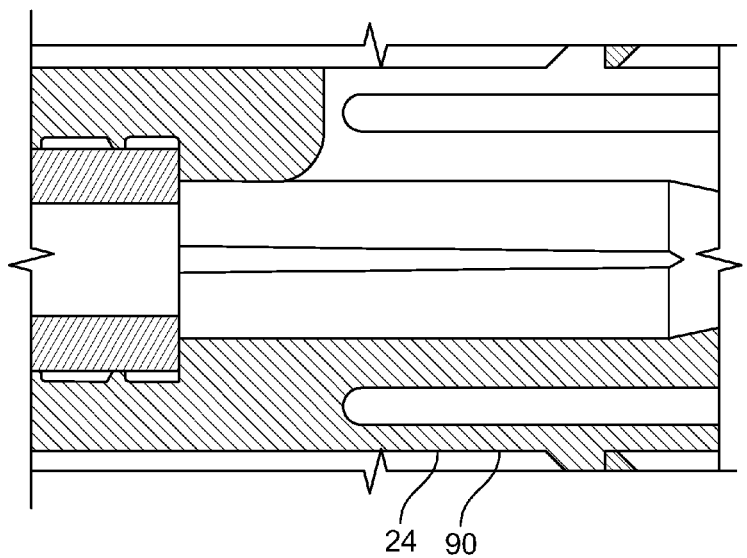
FIG. 19 is a cross-sectional view taken through the lateral fiber access slot of the inner housing of FIG. 18.

Referring to FIGS. 1 and 2, the main outer housing 22 has length $L_1$ that extends between the proximal and distal ends 22A, 22B along a longitudinal axis 56 of the ruggedized fiber optic connector 20. A main O-ring seal 58 is mounted in a groove around the main outer housing 22 and is adapted for providing an environmental seal with the dust cap 42 and/or a fiber optic adapter. Opposing paddles 60 are provided at the distal end 22B of the main outer housing 22. As shown at FIG. 16, the paddles 60 can be angled (i.e. chamfered 61) at their distal-most ends. The main outer housing 22 can also include structure for facilitating providing snap-fit connections with other components of the ruggedized fiber optic connector 20. For example, oppositely positioned latch openings 64 are defined through the main body of the main outer housing 22 at a location adjacent to the proximal end 22A. Also, as shown in FIG. 11, oppositely latching tabs 66 project inwardly from the main body of the main outer housing 22 at a location near the distal end 22B of the main outer housing 22.

The ferrule assembly 28 includes a ferrule 120 and a hub 122. The ferrule 120 is adapted for supporting an optical fiber and has an end face 124 adjacent to which an end face of the optical fiber is located. The optical fiber is typically adhesively affixed within the ferrule 120.

Figure 7:
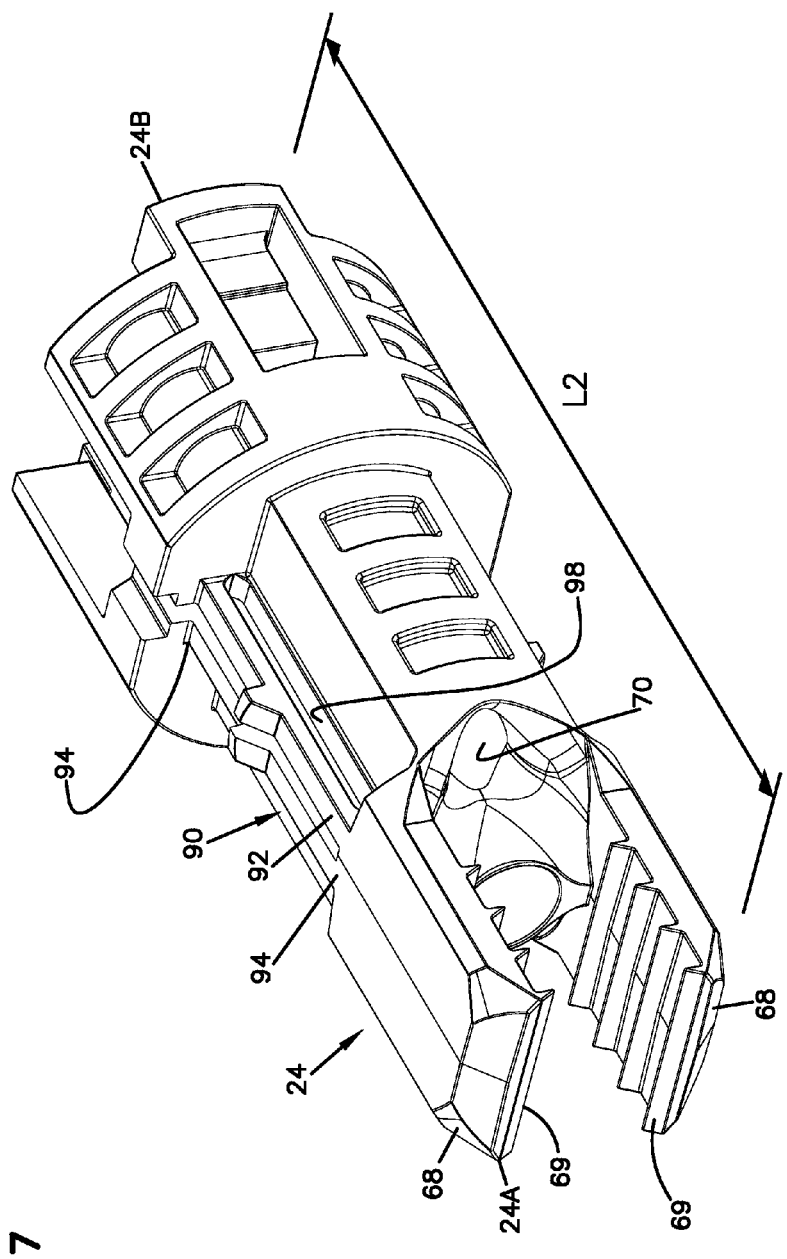
FIG. 7 is a perspective view showing a proximal end of an inner housing of the ruggedized fiber optic connector of FIG. 1.
Figure 8:
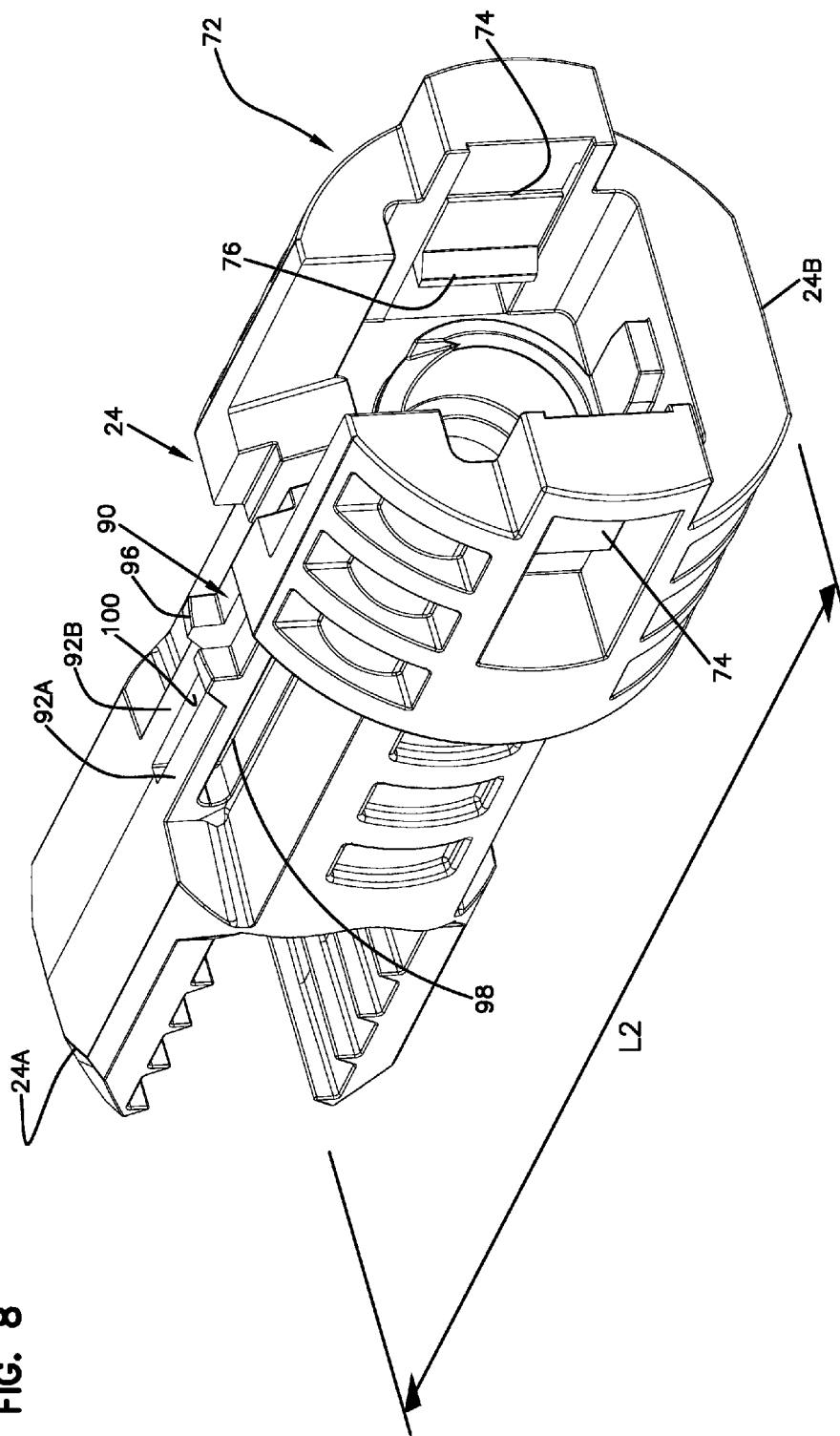
FIG. 8 is a perspective view of a distal end of the inner housing of FIG. 7.
Figure 9:
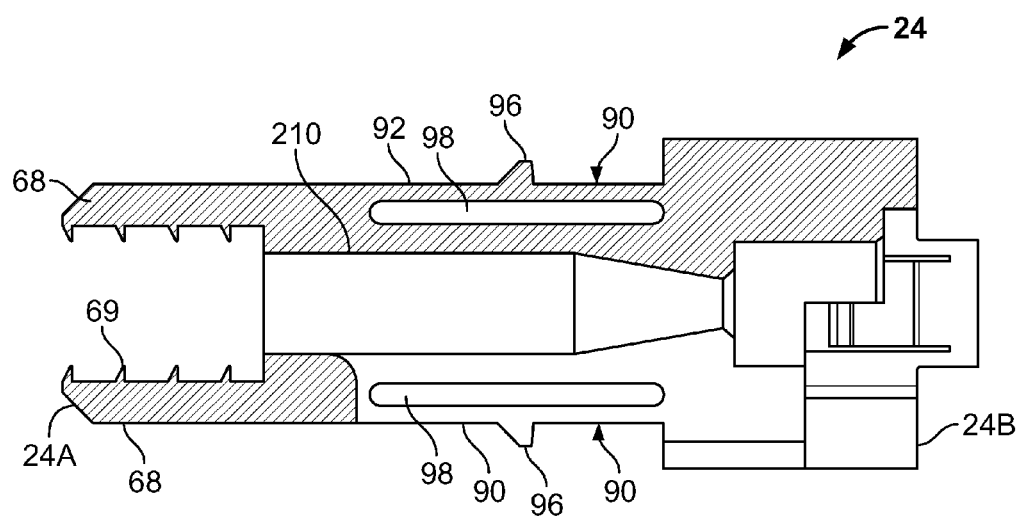
FIG. 9 is a cross-sectional view of the inner housing of FIGS. 7 and 8.
Figure 10:
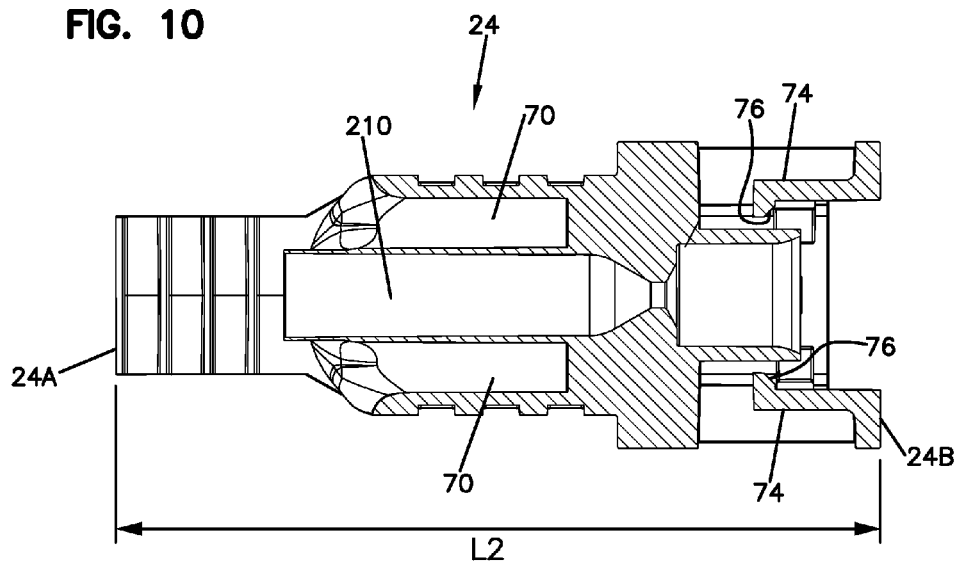
FIG. 10 is another cross-section view of the inner housing of FIGS. 7 and 8.

Referring to FIGS. 2, 7 and 8, the inner housing 24 has a length $L_2$ that extends between the proximal and distal ends 24A, 24B along the longitudinal axis 56. The proximal end 24A is adapted for anchoring the cable 46 to the ruggedized fiber optic connector 20. For example, the proximal end 24A is shown including opposing attachment members 68 each having gripping teeth 69 adapted to embed in a jacket of the cable 46. The inner housing 24 also includes channels 70 for receiving strength members (e.g., fiberglass reinforced epoxy rods or aramid yarn). In certain embodiments, an adhesive material (e.g., epoxy) can be used to secure the strength members within the channels 70. In certain embodiments, the inner housing 24 is transparent so that electromagnetic energy (e.g., radiation, light) can be directed through the inner housing 24 to heat and accelerate curing of the adhesive (e.g., two part epoxy) within the channels 70.

Figure 14:
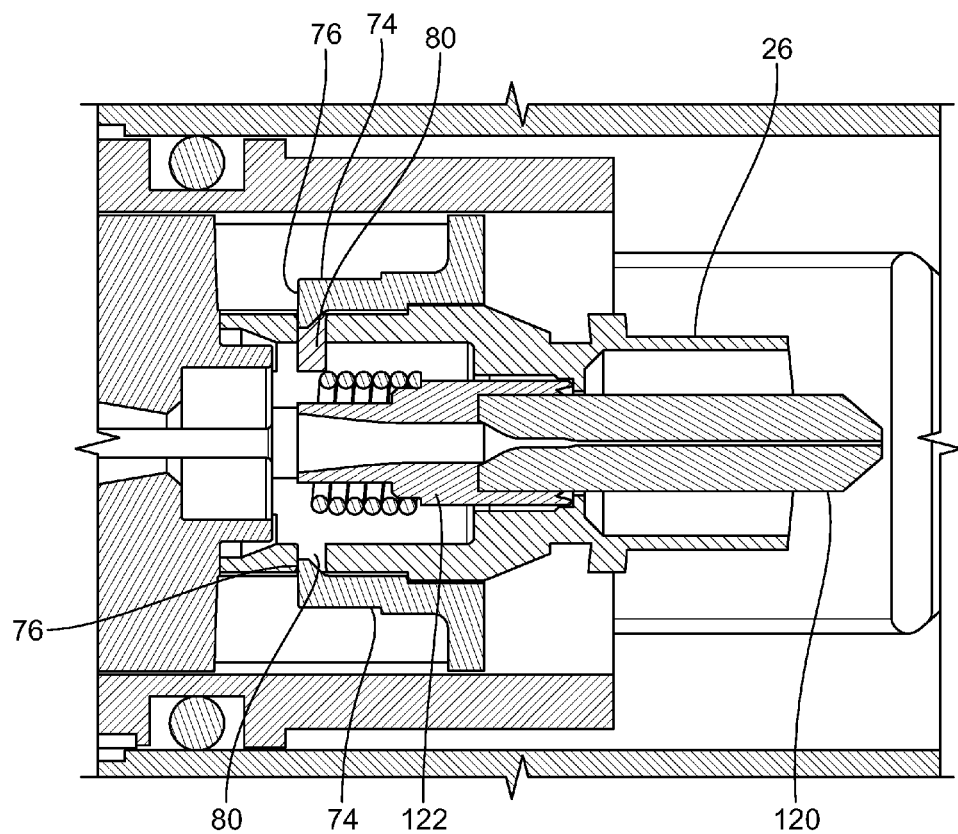
FIG. 14 is a cross-sectional view showing a snap-fit connection in between the inner housing and a plug interface housing of the ruggedized fiber optic connector of FIG. 1.
Figure 15:
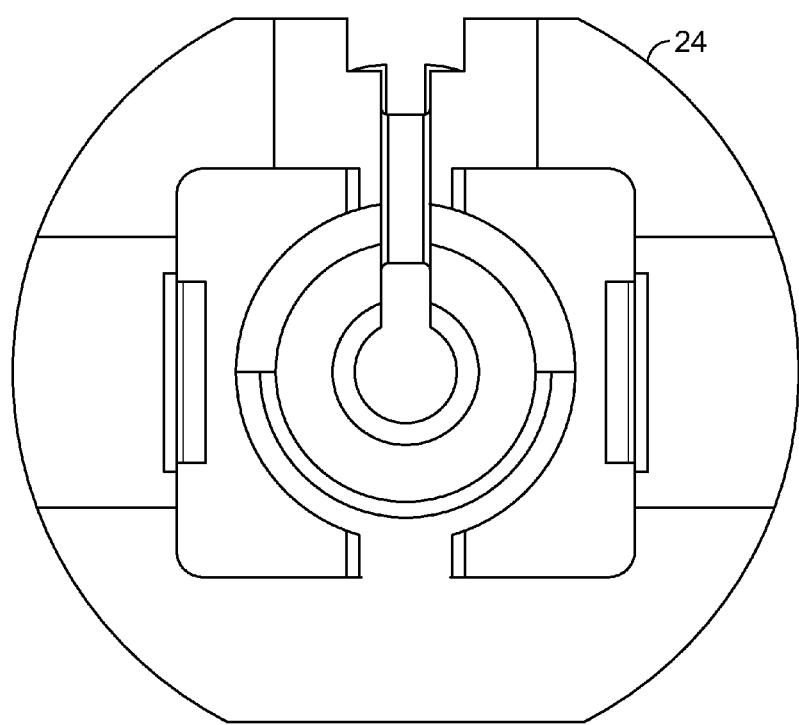
FIG. 15 is a distal end view of the inner housing of the ruggedized fiber optic connector of FIG. 1.

The distal end 24B of the inner housing 24 defines a pocket 72 (see FIG. 8) for receiving the proximal end of the plug interface housing 26. A snap-fit structure is used to provide a snap-fit connection between the distal end 24B of the inner housing 24 and the proximal end of the plug interface housing 26. For example, the inner housing 24 includes a pair of oppositely positioned flexible cantilever latches 74 positioned on opposite sides of the pocket 72. Each of the cantilever latches 74 is generally flexible and has a base end formed with a main body of the inner housing 24. Each of the cantilever latches 74 also includes a retention tab 76 adjacent a free end of the cantilever latches 74. When the proximal end of the plug interface housing 26 is inserted into the pocket 72, the retention tabs 76 snap within corresponding latch openings 80 defined with the plug interface housing 26 (see FIG. 14).

In a preferred embodiment, the inner housing 24 is secured to the main outer housing 22 by a snap-fit connection. For example, the inner housing 24 includes resilient beam structures 90 positioned on opposite sides of the inner housing 24. The resilient beam structures 90 include resilient beams 92 having opposite ends 94 integrally connected with the main body of the inner housing 24. A retention tab structure 96 is provided at a mid-region of each of the resilient beams 92. The resilient beams are separated from the main body of the inner housing 24 by a gap 98. In the depicted embodiments, at least one of the resilient beams 92 has a bifurcated construction with two beam portions 92A, 92B separated by a fiber routing slot 100. The fiber routing slot 100 extends completely through the side wall of the inner housing 24 from the pocket 72 between the beam portions 92A, 92B. In the depicted embodiment, the slot 100 extends through only a portion of the length $L_2$ of the inner housing 24. In other embodiments, the slot 100 can extend through the entire length $L_2$ of the inner housing 24.

The main outer housing 22 and the inner housing 24 can be keyed relative to one another so the inner housing 24 has to be inserted into the main outer housing 22 at a particular rotational orientation. For example, as shown at FIG. 24, the main outer housing 22 has a tab 110 that fits within a corresponding notch within the inner housing 24.

The inner housing 24 is mounted within the main outer housing 22 by orienting the inner housing 24 such that the retention tabs 96 align with the latching tabs 66, and then pushing the inner housing 24 proximally into the distal end 22b of the main outer housing 22. As the inner housing 24 is moved proximally relative to the main outer housing 22, ramped surfaces of the tabs 66, 96 engage one another causing the resilient beams 92 to deflect inwardly to allow the tabs 96 to move proximally past the tabs 66. Once the tabs 96 are past the tabs 66, the beams 92 snap back outwardly such that interference between the tabs 66, 96 prevents the inner housing 24 from being withdrawn from the main outer housing 22 in a distal direction (see FIG. 11). Additionally, opposing shoulders 114, 116 defined respectively by the outer and inner housings 22, 24 limit movement of the inner housing 24 in a proximal direction.

Referring to FIGS. 1 and 4-6, the resilient cable seal 32 has a main body with a length $L_3$ (see FIG. 6) that extends along the longitudinal axis 56 between proximal and distal ends 32a, 32b of the resilient cable seal 32. The resilient cable seal 32 defines the cable sealing passage 44 that extends through the resilient cable seal 32 from the proximal end 32a to the distal end 32b. The resilient cable seal 32 includes a plurality of cable sealing ribs 300 that project inwardly into the cable sealing passage 44 from the main body of the resilient cable seal 32. Each of the cable sealing ribs 300 surrounds the longitudinal axis 56. The cable sealing ribs 300 are spaced-apart from one another along the longitudinal axis 56 and are separated by inner grooves 302 that extend around the longitudinal axis 56. The resilient cable seal 32 also includes a housing sealing portion 304 positioned adjacent the distal end 32b. The housing sealing portion 304 includes a plurality of housing sealing ribs 306 that project outwardly from the main body of the resilient cable seal 32. The housing sealing ribs 306 are spaced-apart from one another along the longitudinal axis 56 and are separated by outer grooves 308 that extend around the longitudinal axis 56. The resilient cable seal 32 also includes an end cap engagement portion 310 positioned adjacent to the proximal end 32a.

Figure 3:
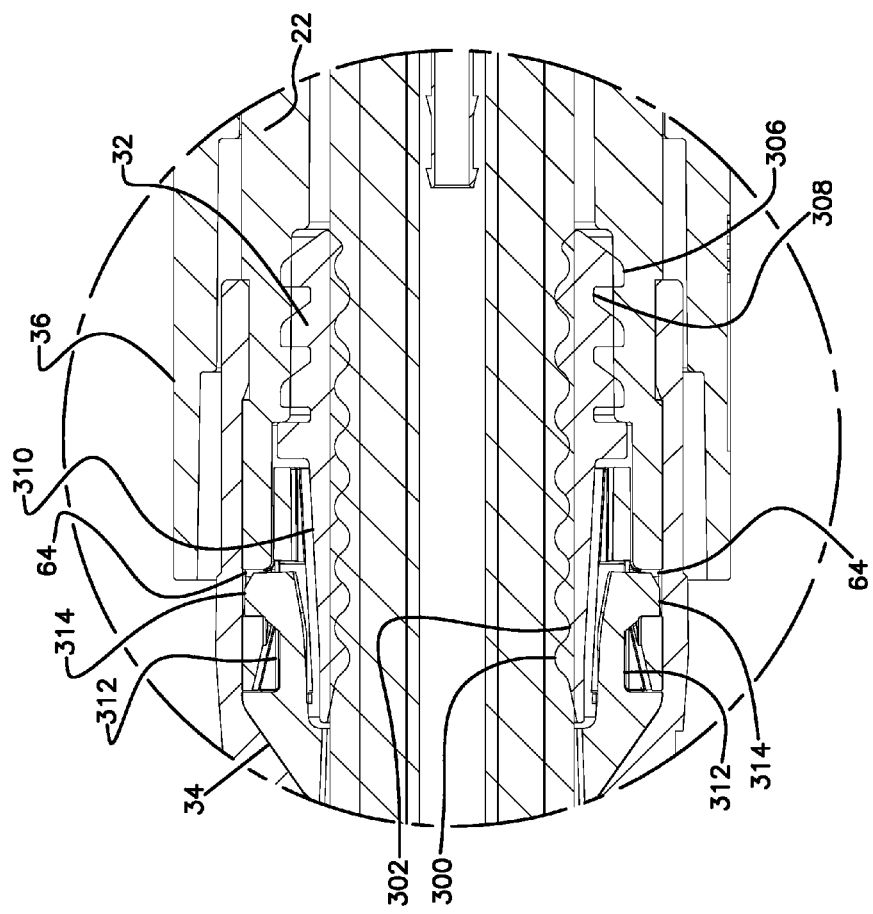
FIG. 3 is an enlarged view of a portion of FIG. 2.

The end cap 34 is mounted at the proximal end 22a of the main outer housing 22 and is secured to the main outer housing 22 by a snap-fit connection. To provide the snap-fit connection, the end cap 34 includes flexible cantilever latches 312 on opposite sides of the end cap 34 (see FIG. 1). The cantilever latches 312 have latching tabs 314 that snap within the openings 64 of the main housing 22 when the end cap 34 is inserted into the proximal end 22a of the main outer housing 22 (see FIG. 3). The end cap 34 fits over the end cap engagement portion 310 of the resilient cable seal 32 and is configured compress the proximal end 32a of the resilient cable seal 32 inwardly toward the longitudinal axis 56.

The end cap 34 and the resilient cable seal 32 are keyed to ensure proper assembly. For example, one of the end cap 34 and the resilient cable seal 32 has a key 318, and the other of the end cap 34 and the resilient cable seal 32 has a keyway 316 that receives the key 318 to ensure proper rotational alignment between the end cap 34 and the resilient cable seal 32. In the example shown in FIG. 25, the key 318 is included on the end cap 34 and the keyway 316 is included on the resilient cable seal 32. More particularly, the end cap 34 includes opposing keys 318 that fit within corresponding keyways 316 defined by the resilient cable seal 32. The end cap engagement portion 310 of the resilient cable seal 32 has an outer surface that is tapered to converge toward the longitudinal axis 56 as the outer surface extends in a proximal direction. The end cap engagement portion 310 of the resilient cable seal 32 and the interior region of the end cap 34 have nesting tapers.

Figure 23:
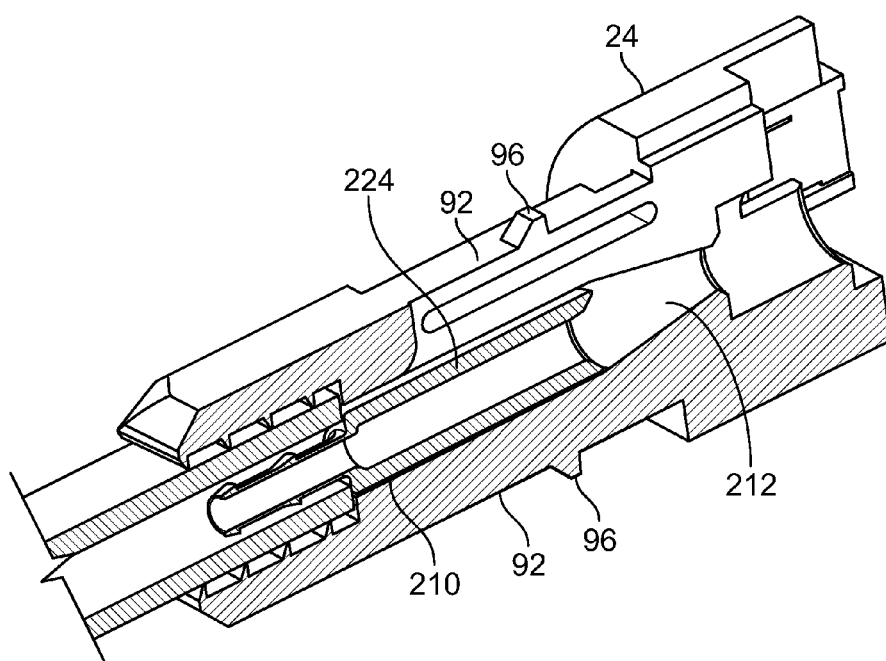
FIG. 23 is a cross-sectional view of a cable interface provided at the proximal end of the inner housing of the ruggedized fiber optic connector of FIG. 1.
Figure 26:
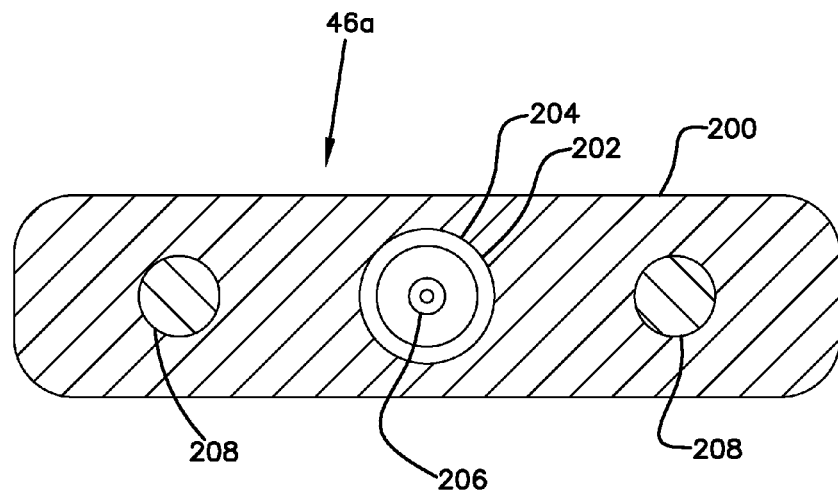
FIG. 26 is transverse cross-sectional view of a drop cable that can be secured and terminated to the ruggedized fiber optic connector of FIG. 1.

In the depicted embodiment, the fiber optic cable 46 is shown as a flat drop cable. It will be appreciated that the cable can have different configurations. FIG. 26 shows one example configuration of a cable 46a suitable for use with the ruggedized fiber optic connector 20. The cable 46a has a flat outer jacket 200 defining a central opening 202. The opening is lined with an optional buffer tube 204. An optical fiber 206 is mounted within the buffer tube 204. The optical fiber 206 has a glass core and cladding surrounded by one or more layers of protective coating (e.g., acrylate coating). In certain embodiments, the coated fiber has an outer diameter less than about 270 microns, or preferably in the range of 240-260 microns. The cable 46a also includes strength members 208 positioned within the jacket 200 on opposite sides of the opening 202. The strength members 208 can provide both tensile and compressive reinforcement to the cable 46a. In one embodiment, the strength members 208 are rods formed of fiber glass reinforced epoxy. To anchor the cable 46a to the connector 20, the strength members 208 are secured by adhesive (e.g., epoxy) within the channels 70 of the inner housing 24 and the jacket 200 is gripped between the attachment members 68. The buffer tube 204 can be routed into a center channel 210 of the inner housing 24. The buffer tube 204 is preferably trimmed such that an end portion of the optical fiber 206 extends distally beyond a distal end of the buffer tube 204. The end portion of the optical fiber 206 can be directed through a funneled region 212 of the inner housing 24 out through the distal end of the housing 24 (see FIG. 23). The coating can be stripped from the end portion of the optical fiber 206 and the optical fiber can be terminated to the ferrule 120. For example, the stripped optical fiber can be routed through the spring 30 and secured directly in the ferrule 120 or can be spliced to the proximal end of an optical fiber stub that has been pre-mounted within the ferrule.

Figure 20:
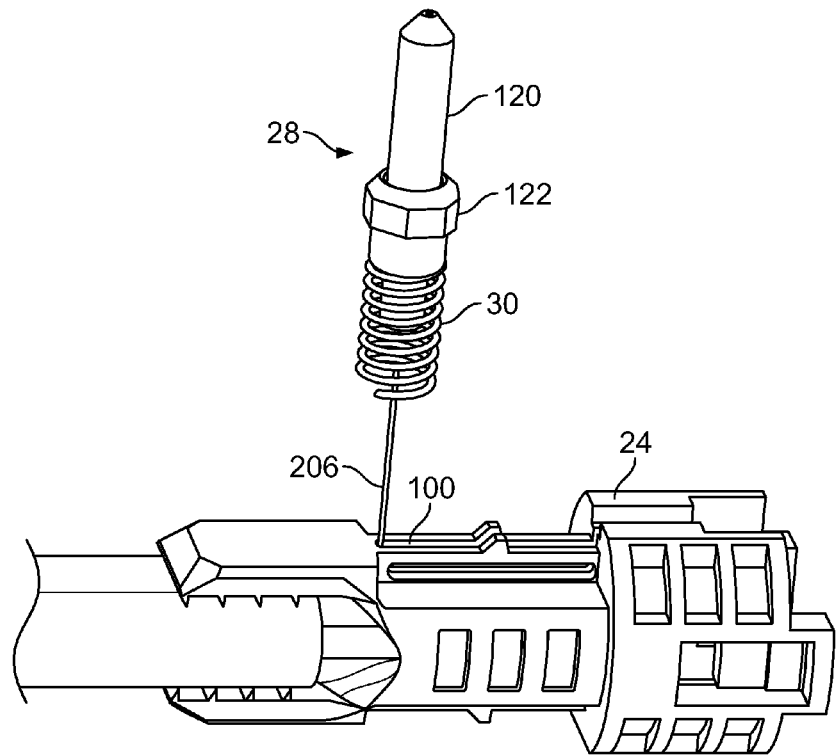
FIGS. 20 and 21 show an optical fiber being routed through the lateral fiber routing slot of the inner housing to allow a fiber stub pre-mounted within a ferrule to be spliced to an end of the optical fiber.
Figure 21:
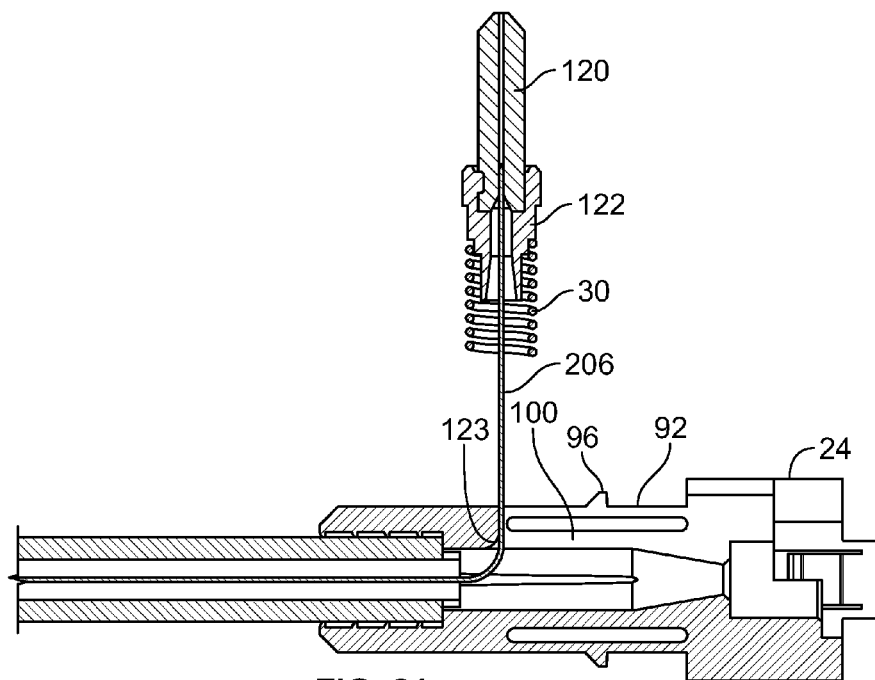
Figure 22:
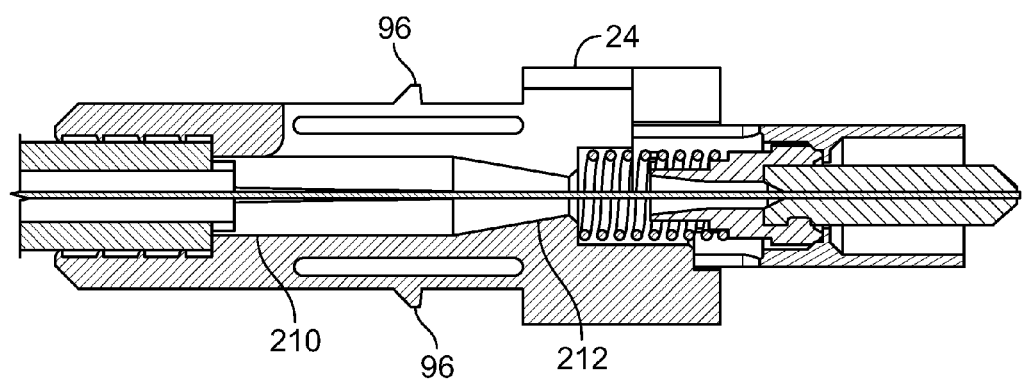
FIG. 22 is cross-sectional view showing the inner housing with an optic fiber routed through a central passage of the inner housing, the optical fiber is shown spliced to a fiber stub secured within a ferrule of the ruggedized fiber optic connector.

The lateral slot 100 through the side wall of the inner housing 24 allows the optical fiber 206 to be routed laterally out of the inner housing 24 (see FIGS. 20 and 21) to provide extra fiber length for facilitating splicing the optical fiber 206 to the optical fiber stub pre-mounted in the ferrule 120 or for facilitating securing the optical fiber 206 directly in the ferrule 120. In certain embodiments, the excess fiber length also facilitates overmolding the hub 122 over the proximal end of the ferrule 120 and over the stub/fiber splice location. A bend radius limiting surface 123 can be provided at the proximal end of the routing slot 100 (see FIG. 21). After the optical fiber 206 has been coupled to the ferrule 120, the optical fiber 206 can be routed laterally back through the fiber routing slot 100 to bring the fiber back into alignment with the longitudinal axis 56 of the connector 20. Thereafter, the ferrule assembly 28 is positioned in the plug interface housing 26 and the plug interface housing 26 is snapped into the pocket 72 of the inner housing 24 (see FIG. 22). Preferably, the spring 30 is captured and compressed between the hub 122 and the inner housing 24.

Figure 27:
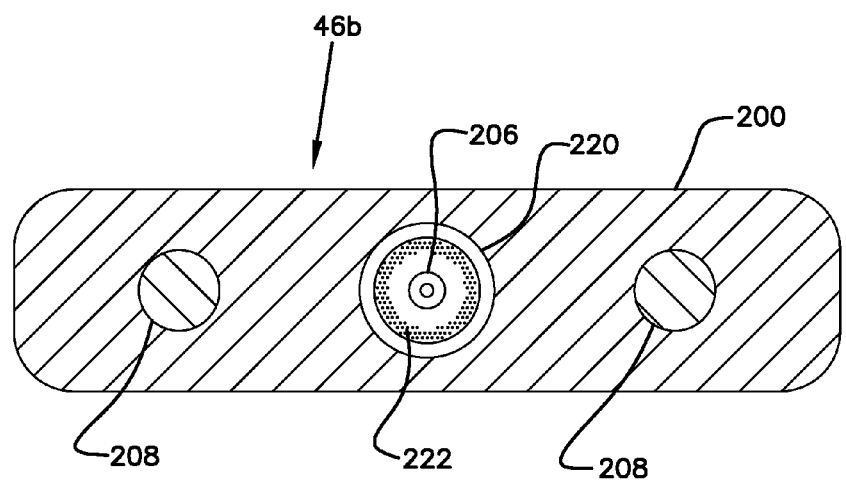
FIG. 27 is a transverse cross-sectional view of another drop cable that can be anchored and terminated to the ruggedized fiber optic connector of FIG. 1.

FIG. 27 shows a cable 46b similar to the cable 46a except the buffer tube 204 has been replaced with a cable jacket 220 and a layer of strength members 222 (e.g., aramid yarn) has been positioned between the cable jacket 220 and the optical fiber 206. To anchor this type of cable 46b, the jacket 220 and an insert 224 is inserted into the end of the jacket 220 for guiding the optical fiber 206 into and through the center channel 210. The strength members 222 are separated into two groups and adhesively secured with the strength members 208 in the channels 70. In the depicted cross-sectional views, the various seals are shown in a non-deformed state and thus overlap the parts against which they seal. It will be appreciated that in practice the seals will deform to fill voids between the components and will not overlap the components as shown.

The invention claimed is:

1. A fiber optic connector comprising:
a main outer housing having a distal end and a proximal end, the main outer housing also including a length that extends along a longitudinal axis of the fiber optic connector between the proximal and distal ends of the main outer housing;
an inner housing that mounts within the main outer housing, the inner housing being secured to the main outer housing by a first snap-fit connection, the inner housing having a length that extends along the longitudinal axis of the fiber optic connector between proximal and distal ends of the inner housing;
a plug interface housing secured at the distal end of the inner housing by a second snap-fit connection;
a ferrule assembly mounted at least partially within the plug interface housing, the ferrule assembly having a ferrule having a length that extends along the longitudinal axis between proximal and distal ends of the ferrule, the distal end of the ferrule including an interface end face, the ferrule assembly also including a hub mounted at the proximal end of the ferrule;
a spring for biasing the ferrule assembly in a distal direction;
a resilient cable seal that mounts within the main outer housing, the resilient cable seal having a main body including a length that extends along the longitudinal axis between proximal and distal ends of the resilient cable seal, the resilient cable seal defining a cable sealing passage that extends through the resilient cable seal from the proximal end of the resilient cable seal to the distal end of the resilient cable seal, the resilient cable seal including a plurality of cable sealing ribs that project inwardly into the cable sealing passage from the main body of the resilient cable seal, each of the cable sealing ribs surrounding the longitudinal axis, the cable sealing ribs being spaced-apart from one another along the longitudinal axis and being separated by inner grooves that extend around the longitudinal axis, the resilient cable seal also including a housing sealing portion positioned adjacent the distal end of the resilient cable seal, the housing sealing portion including a plurality of housing sealing ribs that project outwardly from the main body of the resilient cable seal, the housing sealing ribs being spaced-apart from one another along the longitudinal axis and being separated by outer grooves that extend around the longitudinal axis, the resilient cable seal also including an end cap engagement portion positioned adjacent to the proximal end of the resilient cable seal;
an end cap mounted at the proximal end of the main outer housing, the end cap being secured to the main outer housing by a third snap-fit connection, the end cap fitting over the end cap engagement portion of the resilient cable seal and being configured to compress the resilient cable seal inwardly toward the longitudinal axis; and
a coupling nut that mounts over the main outer housing.

2. The fiber optic connector of claim 1, wherein one of the end cap and the resilient cable seal has a key, and the other of the end cap and the resilient cable seal has a keyway that receives the key to ensure proper rotational alignment between the end cap and the resilient cable seal.

3. The fiber optic connector of claim 2, wherein the key is included on the end cap and the keyway is included on the resilient cable seal.

4. The fiber optic connector of claim 3, wherein the end cap includes opposing keys that fit within corresponding keyways defined by the resilient cable seal.

5. The fiber optic connector of claim 1, wherein the end cap engagement portion of the resilient cable seal has an outer surface that is tapered to converge toward the longitudinal axis as the outer surface extends in a proximal direction.

6. The fiber optic connector of claim 1, wherein the end cap engagement portion of the resilient cable seal and an interior region of the end cap have nesting tapers.

7. The fiber optic connector of claim 1, wherein the inner housing includes a main body, wherein the first snap-fit connection includes a snap fit structure including a resilient beam separated from the main body by a gap, the resilient beam having fixed ends, the snap-fit structure also including a beam tab that projects outwardly from the resilient beam at a location between the fixed ends, the beam tab being configured to engage an inner tab of the main outer housing when the inner housing is inserted into the main outer housing.

8. The fiber optic connector of claim 7, wherein the beam is a split-beam having first and second beam portions separated by a slot which allows an optical fiber to be laterally passed through a side wall of the inner housing.

9. The fiber optic connector of claim 8, wherein the slot extends along only a portion of the length of the inner housing.

10. The fiber optic connector of claim 8, wherein the slot extends along the entire length of the inner housing.

11. The fiber optic connector of claim 1, wherein the distal end of the inner housing defines a pocket for receiving a proximal end of the plug interface housing, and wherein the second snap-fit connection includes opposing resilient cantilever latches defined by the inner housing adjacent the pocket, the resilient cantilever latches including tabs that snap within corresponding openings defined by the plug interface housing.

* * * * *